3,068,290
PROCESS OF MAKING ETHYLENEDIAMINE
Robert Lichtenberger, Oullins, and Francis Weiss, Pierre-Benite, France, assignors to Societe d'Electro-Chimie d'Electro-Metallurgie et des Acieries Electriques d'Ugine, Paris, France, a corporation of France
No Drawing. Filed July 17, 1958, Ser. No. 749,064
Claims priority, application France July 23, 1957
6 Claims. (Cl. 260—585)

The present invention relates to a process of making ethylenediamine by reaction of ammonia on monoethanolamine or on ethylene oxide, in the presence of a catalyst.

The catalytic aminating of alcohols by ammonia in the presence of a hydrogenation catalyst is a process well known in itself which has been applied to numerous alcohols. However, this process, relatively easy in the case of secondary alcohols, is more difficult to realize in the case of primary alcohols which generally require the use of high temperatures and pressures.

In many cases, the operating conditions, particularly costly, lead to extremely low transformation rates or to prohibitive formation of condensation products.

The application of this process to the amination of diols and aminoalcohols has already been proposed. In this respect, Fowler U.S. Patent No. 2,519,560 of August 22, 1950 discloses that, although the aminating of 1-amino, 2-propanol (having a secondary alcohol radical) into 1-2-propylene diamine is possible with satisfactory results, it is not possible, during the aminating of 1-2-propanediol, to go beyond the step 2-amino, 1-propanol, therefore to aminate the primary alcohol radical even at a temperature of 175–185° C. and under a pressure of 50–100 atm. in the presence of Raney nickel.

In this respect too, Ralph C. Schreyer U.S. Patent No. 2,754,330 of July 10, 1956 claims the amination of aminoalcohols or of glycols having a straight chain of formula: $HO(CH_2)_nX$, wherein $X=OH$ or $NH_2$ and $n$ is at least equal to 6, at a temperature of 150–250° C. and under a very high pressure (at least 400 atm.) in the presence of a catalyst made principally of ruthenium. However, when $n$ is lower than 6, the process cannot be applied because of the preponderant cyclization of the reaction products. An example is given of monoethanolamine itself which, treated with an excess of ammonia at 225–232° C. under 910 atm. and in the presence of hydrogen, gives chiefly, besides a little ethylenediamine, piperazine and residues.

Besides Grignard (Traite de Chimie Organique XXI, pp. 46–47) indicates that in the presence of hydrogenation catalyst, at 195° C., ethylenediamine is transformed almost entirely into piperazine by elimination of ammonia.

Moreover, it is known that, by passing monoethanolamine vapors over a dehydrogenizing catalyst, between 230 and 300° C., a larger amount of resinified products is obtained, besides a small amount of pyrazine, that is a dehydrogenized cyclic product.

In consequence, we can say that, up to this time, it has never been possible to aminate directly a primary dialcohol or a primary aminoalcohol containing a small number of carbon atoms, such as monoethanolamine, for instance, with a suitable industrial result.

In fact, the only processes for the manufacture of ethylenediamine practically utilized consist in starting from symmetric dichloroethane or from aminoacetonitrile. In the first process, the symmetric dichloroethane is aminated by anhydrous or aqueous ammonia at high temperature and under high pressure, and afterwards the amines are freed from their chlorhydrates by action of sodium hydroxide. The main disadvantages of this process consist in the severe corrosion of the apparatus by ammonium chloride and in the difficulty in quantitatively recovering the amines from their diluted aqueous solution charged with sodium chloride. Effectively, it is necessary to distill large amounts of water and, afterwards, to separate the residual amines from the precipitated sodium chloride by centrifuging or by filtering.

In the second process, the aminoacetonitrile is hydrogenized, said aminoacetonitrile being obtained from glycolonitrile, that is from formaldehyde cyanohydrin. But the raw materials are costly and the instability of the intermediary products makes the obtention of satisfactory outputs uncertain.

At last, a process has been described for the obtention of ethylenediamine by pressure amination of ethyleneimine obtained from monoethanolamine, for example, by action thereon of concentrated sulphuric acid and by treatment of the resulting aminoethyl bisulphate with an excess of aqueous soda. But such a process is not economical because of the number of intermediary steps and the large consumption of sulphuric acid and soda it involves; besides the intermediary ethyleneimine is a most dangerous product because of its toxicity and the risks of explosive polymerization it presents.

The applicants have found it possible to manufacture ethylenediamine by amination of monoethanolamine or ethylene oxide, in liquid phase, thereby avoiding all of the disadvantages of the usual processes.

The present invention relates to a process for the manufacture of ethylenediamine consisting in reacting in liquid phase at a temperature of 150–250° C., preferably from 180–210° C., under autogenous pressure, anhydrous ammonia and monoethanolamine or ethylene oxide in the presence of a hydrogenation aminating catalyst.

The process depends on several factors.

The temperature affects the reaction speed. As hereabove indicated, it is necessary to operate between 150 and 250° C. and, preferably, between 180 and 210° C.

The aminating catalyst may be chosen from the following usual hydrogenation catalysts: Raney nickel or cobalt, reduced nickels, alone or on a supporting medium, copper chromite, platinum, osmium, palladium, etc. The amount of these catalysts to be used may vary according to the nature thereof and the desired reaction speed. Generally, suitable amounts range from 0.5 to 20% by weight of monoethanolamine.

The preferred hydrogenation catalyst is composed of metallic nickel which is finely divided and magnesia, the catalyst being obtained by thermal decomposition of coprecipitated nickel and magnesium formates or oxalates. These Ni-MgO catalysts have proved to be much more active than the usual hydrogenation catalysts just referred to. By using the Ni-MgO catalyst, it is possible to reduce both the reaction temperature and the contact duration, thus decreasing the formation of by-products while maintaining high amination speed.

The preparation of the Ni-MgO catalyst comprises the coprecipitation of nickel and magnesium salts, i.e., the coprecipitation of nickel and magnesium formates or the coprecipitation of nickel and magnesium oxalates. In the case of formates which are soluble in water, it is only necessary to evaporate the mixed aqueous solution of nickel and magnesium formates. In the case of oxalates, a mixed aqueous solution of nickel and magnesium salts, for instance nitrates or acetates, is reacted with oxalic acid or an alkaline oxalate solution to thereby coprecipitate a mixture of nickel and magnesium oxalates. The coprecipitate is then filtered.

These mixed salts (mixture of nickel formate and magnesium formate or mixture of nickel oxalate and magnesium oxalate) are decomposed according to a known method by merely heating to a determined temperature. The last element of the decomposition is metallic nickel in the case of nickel formate and oxalate. The last element of the decomposition is magnesium oxide in the case of magnesium formate and oxalate. The decomposition temperature of the mixed nickel and magnesium formates is between 250 and 350° C., depending upon their magnesium salt content and that of the mixed nickel and magnesium oxalates is between 300 and 450° C. By decomposition carried out in a current of hydrogen, it is possible generally to lower the decomposition temperature some 10 degrees without noticeably modifying the activity of the obtained catalysts.

The proportions of nickel and magnesia may vary considerably. However, the most active catalysts are those in which the atomic ratio Ni/Mg is between 3:1 and 1:4.

The activity of the Ni-MgO catalysts prepared in the described manner, being much greater than that of the usual hydrogenation catalysts, permits either a reduction of the quantity utilized or a decrease in temperature or in reaction time. Preferably, the amount of the Ni-MgO catalyst used is such as to provide from 1 to 10% by weight of nickel based on the weight of the monoethanolamine. The preferred temperature is between 150 and 180° C. and the contact duration is between 1 and 6 hours, according to the desired transformation.

The amount of ammonia utilized may vary within a very wide range, from the stoichiometric quantity to quantities of 10 molecules or more for one molecule of alcohol. The choice of the molar ratio depends on the final result desired. Under conditions similar in other respects, a large excess of ammonia ensures a high output of ethylenediamine, while a moderate excess, for instance 2 moles for one molecule of monoethanolamine, aids in forming condensation products such as piperazine, diethylenetriamine, triethylenetetramine, N-hydroxyethylethylenediamine, etc., obtained by elimination of ammonia between ethylenediamine molecules or between ethylenediamine and ethanolamine molecules. This adaptability of the process allowing the distribution of the reaction products to be directed at will by mere selection of the reactive agents' ratio, is advantageous because some of the abovementioned condensation products have an industrial value.

However, the excess of ammonia alone does not indicate exactly the conditions under which the reaction is carried out. Effectively, the working conditions being situated beyond the critical point of ammonia, the liquid phase, that is the reaction medium properly so-called, does not contain the amount of ammonia soluble therein only. For a determined temperature, said solubility is a function of the autogeneous pressure. It is possible to obtain a determined autogeneous pressure with a relatively small quantity of ammonia, provided the free space in the autoclave is small, which is the case when the autoclave contains more monoethanolamine. Thus, it is possible to obtain outputs very high in ethylenediamine, though only a moderate excess of ammonia is utilized, about 2 to 3 moles for each mole of monoethanolamine, by choosing such a degree of filling of the apparatus that a suitable autogeneous pressure can be reached.

One of the preferable methods for carrying out the invention consists in operating with a slight excess of ammonia, choosing such a filling degree that the autogeneous pressure may be reached at an optimum value for the desired result. It is particularly advantageous to use a moderate excess of ammonia since the output is considerably increased and, on the other hand, the importance of the recycling circuit of the anhydrous ammonia is decreased.

This possibility of obtaining high outputs of ethylenediamine with a slight excess of ammonia was quite unexpected. It is effectively known that in aminating dichloroethane a considerable excess of ammonia, about 10 to 15 moles per mole of dichloroethane, is absolutely necessary to prevent the condensation products of ethylenediamine from becoming predominant.

In consequence, the same thing might be feared in the process for aminating monoethanolamine and it is actually so when an autogeneous pressure, therefore a suitable solubility of the ammonia in the liquid phase, is not carefully ensured. In consequence, the choice of a determined filling degree, in connection with the slight excess of ammonia, is an important characteristic of the invention.

For example, an ammonia pressure of about 130 to 170 kg./cm.$^2$ at 200° C. will aid in obtaining an ethylenediamine output of 70–90% of the transformed monoethanolamine, said output value depending on the amount of transformation of the monoethanolamine. The residue consists in the abovementioned piperazine and polyamines. Under low pressures, about 80 to 130 kg./cm.$^2$, the ethylenediamine output decreases progressively to about 40%, for example, in favor of the polyethylenepolyamines, 1 kg./cm.$^2$ equals approximately 1 atmosphere.

If desired, it will be possible to operate with an additional pressure of a gas such as nitrogen or hydrogen, but pratcically the results will only be influenced by the partial pressure of the ammonia of the system. The condensation products are essentially formed at the expense of the ethylenediamine itself so that, as the transformation of monoethanolamine is going on, the transformation of the condensation products increases and the ethylenediamine output decreases. The simplest method for limiting the ethylene diamine concentration, thereby the formation speed of its condensation products, consists in limiting the transformation of the momonethanolamine, the unchanged product being used then as a diluent. This involves no complication for the ethylenediamine and monoethanolamine separation by distillation is very easy. We are still within the scope of the invention when we use an inert diluent, for instance water or methanol, thereby allowing the transformation of the monoethanolamine to be completed, but then the transformation speed of the monoethanolamine decreases because of the dilution thereof.

A method for executing the invention consists in using ethylene oxide directly instead of monoethanolamine. Effectively, it is well known that ethylene oxide and ammonia react immediately to form a mixture of ethanolamines. Afterwards, said ethanolamines are subjected to catalytic amination according to the invention process. It is also possible to use either the raw mixture of ethanolamines from ethylene oxide, or any aminoalcohol obtained by action of ammonia on ethylene oxide.

It is advantageous that the utilized reagents should be free from the usual poisons of the metallic catalysts, sulphur in particular. A previous cold treatment of the monoethanolamine by a purifying agent, activated alumina for instance, or by a reduced metal such as copper or nickel, may prevent the catalyst from a progressive poisoning.

The process although described essentially in the case of a discontinuous realization, may be easily realized continuously. Ammonia and monoethanolamine, or ethylene oxide, are introduced through a pump into a reactor represented, for example, as a catalyst-containing column wherein the agitating of the liquid phase is executed by means of a circulating pump, wherefrom the reaction mixture is continuously drawn. Thus, the apparatus works as a one-stage continuous reactor and the contact duration is chosen from the kinetic data in order to determine an optimum conversion rate.

The manufacturing process according to the invention presents many technical and economical advantages. In the raw product of the reaction, the amines are free and their distillation is sufficient without any other previous treatment. Said raw product contains only the exact quantity of water corresponding to the amination; therefore, the dilution of the amines is the slightest and the distillation costs are the lowest possible. The absence of mineral salts by-products, contrarily to usual processes, renders the operation easier and avoids the costly disadvantages of their corrosive action on the apparatus. The raw material is abundant and cheap. At last, with relatively moderate amounts of ammonia, high outputs of ethylenediamine are obtained.

The non-limitative examples given hereunder permit a better understanding of the invention. The utilized monoethanolamine is the technical product with no particular previous purification.

EXAMPLE I

Into a 5-litre oscillating autoclave there were introduced:

366 g. monoethanolamine (6 moles)
1160 g. ammonia (68 moles)
60 g. Raney nickel

This mixture was heated at 180° C. for 6 hours. The pressure was 145–150 kg./cm.$^2$. After completion of the reaction, the excess ammonia was eliminated and the reaction mixture fractionally distilled. There were collected:

221 g. of a water-ethylenediamine mixture ($E_{100}$:68–72°) containing 140 g. ethylenediamine
9.5 g. piperazine
188.5 g. unchanged monoethanolamine
41.5 g. superior amines The total transformation of monoethanolamine was 48.5% and the ethylenediamine output corresponded to 80% of the transformed monoethanolamine.

The conservation of the catalyst activity was verified by reusing it in numerous successive operations realized under the same conditions.

EXAMPLE II

A charge the same as in Example I was heated for 2 hours in the same autoclave at 200° C. under an autogenous pressure of 170 kg./cm.$^2$. After distillation of the reaction mixture, we obtained:

225 g. of a water-ethylenediamine mixture containing 141 g. ethylenediamine
6 g. piperazine
160 g. unchanged monoethanolamine
44 g. superior amines The total transformation of the monoethanolamine was 53.5% and the output of ethylenediamine corresponded to 73% of the transformed monoethanolamine.

EXAMPLE III

Into the same autoclave there were charged:

1100 g. monoethanolamine (18 moles)
690 g. ammonia (40.5 moles)
120 g. Raney nickel This mixture was heated at 180° C. for 6 hours; the pressure was 80–82 kg./cm.$^2$. This reaction mixture was distilled and we obtained:

478 g. of a mixture containing water and 260 g. ethylenediamine
70 g. piperazine
525 g. unchanged monoethanolamine
289 g. heavy amines The latter fraction was submitted to a new distillation which gave the following results:

103 g. diethylenetriamine ($E_{10}$:87°)
138 g. hydroxyethylethylene diamine ($E_{10}$:125°)
The residue was formed of triethylene tetramine and of various amines.

The total transformation of the monoethanolamine was 52.3% and the ethylenediamine output corresponded to 46% of the transformed monoethanolamine.

EXAMPLE IV

Into the same autoclave there were charged:

1100 g. monoethanolamine (18 moles)
880 g. ammonia (52 moles)
30 g. Raney nickel This mixture was heated for 6 hours at 200° C. under an autogenous pressure of 130 kg./cm.$^2$.

After distillation of the reaction mixture, we obtained:

336 g. of an ethylenediamine-water fraction containing 205 g. ethylenediamine
28 g. piperazine
693 g. unchanged monoethanolamine
60 g. diethylenetriamine
180 g. heavy amines The total transformation of the monoethanolamine was 37% and the ethylenediamine output corresponded to 52.5% of the transformed monoethanolamine.

EXAMPLE V

A charge consisting of:

367 g. monoethanolamine (6 moles)
915 g. ammonia (54 moles)
90 g. of a catalyst containing 22.5 g. reduced nickel deposited on a support made principally of calcium silicoaluminates was heated at 180° C. for 6 hours under a pressure of 125 kg./cm.$^2$.

After distillation, we obtained:

36.5 g. of water-ethylenediamine fraction containing 17 g. ethylenediamine
328 g. unchanged ethanolamine
24.5 g. superior amines The total transformation of the monoethanolamine was 10.5% and the ethylenediamine output corresponded to 45% of the transformed monoethanolamine.

EXAMPLE VI

A charge consisting of:

366 g. monoethanolamine (6 moles)
108 g. water (6 moles)
1050 g. ammonia (62 moles)
60 g. Raney nickel was heated at 200° C. for 2 hours under a pressure of 145 kg./cm.$^2$. After elimination of the ammonia and of a great part of the water, we obtained by distilling the reaction mass:

117 g. ethylenediamine
4.5 g. piperazine
210 g. unchanged monoethanolamine
30 g. heavy amines The total transformation of the monoethanolamine was 42.5% and the ethylenediamine output corresponded to 76.5% of the transformed monoethanolamine.

EXAMPLE VII

Into an 0.8 litre autoclave there were charged:

183 g. monoethanolamine (3 moles)
170 g. ammonia (10 moles)
3 g. pulverulent nickel obtained by thermal decomposition of nickel formate This mixture was heated at 200° C. for 2 hours under a pressure of 120 kg./cm.$^2$.

The total transformation of the monoethanolamine was 59% and the ethylenediamine output corresponded to 54% of the transformed monoethanolamine.

EXAMPLE VIII

Into an 0.8 litre autoclave there were charged:

183 g. monoethanolamine (3 moles)
140 g. ammonia (8.25 moles)
20 g. Raney cobalt This mixture was heated at 180° C. for 2 hours under a pressure of 110 kg./cm.² After distillation we obtained:

32 g. ethylenediamine
12.5 g. piperazine
104 g. unchanged monoethanolamine
28 g. superior amines The total transformation of the monoethanolamine was 42.9% and the ethylenediamine output corresponded to 41% of the transformed monoethanolamine.

EXAMPLE IX

First, a mixed nickel and magnesium formate was prepared in which both metals were in equiatomic proportion by evaporating a mixed aqueous solution of nickel formate and magnesium formate. Then this formate was decomposed by heating for 2 hours at 260° C.

Into an 0.8 litre autoclave there were charged:

150 g. monoethanolamine
210 g. anhydrous ammonia
A quantity of catalyst thus obtained in an amount corresponding to 3 g. nickel (that is 2% of the utilized monoethanolamine)

The mixture was heated for 4 hours at 180° C. under an autogenous pressure of 145 atm. After distillation of the reaction mixture, we obtained:

95 g. of a water-ethylenediamine mixture containing 56 g. ethylenediamine
A fraction containing 9 g. piperazine and some unchanged monoethanolamine
5 g. residues The total transformation of the monoethanolamine was 49.5% and the output of ethylenediamine corresponded to 76.5% of the transformed monoethanolamine.

EXAMPLE X

A mixed formate in which the atomic proportion Ni/Mg=1/3 was decomposed by heating for 1 hour at 350° C. under a hydrogen current. The same amination operation as in Example IX was repeated with the obtained catalyst, also utilized in a proportion corresponding 3 g. nickel, that is 2% of the utilized monoethanolamine. After distillation of the reaction mixture, we obtained:

77 g. of a water-ethylenediamine fraction containing 48 g. ethylenediamine and only traces of piperazine
The rest consisted of unchanged monoethanolamine and 6 g. residues The total transformation was 37% and the output of ethylenediamine corresponded to 89.5% of the transformed monoethanolamine.

EXAMPLE XI

The following table gives comparisons between the efficiencies of the Ni-MgO catalysts prepared as described and those of other catalysts. A series of tests was performed under identical conditions of temperature, contact duration and reactive reagent proportions. The activity of the catalysts is represented by a value "$a$," which is the amount of ethylenediamine obtained (expressed in grammes) in 2 hours at 180° C. with a quantity of catalyst equivalent to one gramme of metallic nickel.

Table

| Catalyst: | "$a$" |
|---|---|
| Raney nickel | 0.8 |
| Raney cobalt | 1.6 |
| Nickel obtained by thermal decomposition of its formate | 2.7 |
| Ni-MgO catalyst obtained by thermal decomposition of mixed formate (Ni/Mg=1/1) | 9.3 |
| Ni-MgO catalyst obtained by thermal decomposition of mixed formate (Ni/Mg=1/2) | 7.3 |
| Ni-MgO catalyst obtained by thermal decomposition of mixed formate (Ni/Mg=1/3) | 8.0 |
| Ni-MgO catalyst obtained by thermal decomposition of mixed oxalate (Ni/Mg=2/1) | 3.3 |

The invention is not limited to the preferred embodiments but may be otherwise embodied or practiced within the scope of the following claims.

We claim:

1. A process of making ethylenediamine which comprises reacting in liquid phase at about 80 to 170 atmospheres at a temperature of 150 to 250° C., ammonia and monoethanolamine in the presence of an amination catalyst consisting of mixed magnesium oxide and metallic nickel, wherein the atomic Ni/Mg ratio is between 3:1 and 1:4, said catalyst being obtained by coprecipitating a mixture of nickel and magnesium salts selected from the class consisting of the formates and oxalates, and then subjecting said mixture of coprecipitated nickel and magnesium salts to thermal decomposition to bring the magnesium salt to the MgO state and to reduce the nickel salt to the metallic state.

2. A process of making ethylenediamine which comprises reacting in liquid phase at about 80 to 170 atmospheres at a temperature of 150 to 250° C., ammonia and monoethanolamine in the presence of an amination catalyst consisting of mixed magnesium oxide and metallic nickel, wherein the atomic Ni/Mg ratio is between 3:1 and 1:4, said catalyst being obtained by evaporating a mixed aqueous solution of nickel and magnesium formates to coprecipitate a mixture of nickel and magnesium formates, and then subjecting said mixtures of coprecipitated nickel and magnesium formates to thermal decomposition to bring the magnesium formate to the MgO state and to reduce the nickel formate to the metallic state.

3. A process of making ethylenediamine which comprises reacting in liquid phase at about 80 to 170 atmospheres at a temperature of 150 to 250° C., ammonia and monoethanolamine in the presence of an amination catalyst consisting of mixed magnesium oxide and metallic nickel, wherein the atomic Ni/Mg ratio is between 3:1 and 1:4, said catalyst being obtained by reacting a mixed aqueous solution of nickel and magnesium salts selected from the class consisting of nitrates and acetates with a member selected from the class consisting of oxalic acid and alkaline oxalates to coprecipitate a mixture of nickel and magnesium oxalates, and then subjecting said mixture of coprecipitated nickel and magnesium oxalates to thermal decomposition to bring the magnesium oxalate to the MgO state and to reduce the nickel oxalate to the metallic state.

4. A process according to claim 1, wherein the mixture of coprecipitated nickel and magnesium salts is a mixture of the formates and the thermal decomposition of which is carried out between 250 and 350° C.

5. A process according to claim 1, wherein the mixture of coprecipitated nickel and magnesium salts is a mixture of the oxalates and the thermal decomposition of which is carried out between about 300 and 450° C.

6. A process according to claim 1, wherein the thermal decomposition is carried out in a current of hydrogen.

References Cited in the file of this patent

UNITED STATES PATENTS

| 2,519,560 | Fowler | Aug. 22, 1950 |
| 2,754,330 | Schreyer | July 10, 1956 |
| 2,861,995 | MacKenzie | Nov. 25, 1958 |

OTHER REFERENCES

Ellis: "Hydrogenation of Organic Substances," pp. 57, 58 and 129 (1930). (Copy of above in Pat. Off. Sci. Lib.)

UNITED STATES PATENT OFFICE
CERTIFICATE OF CORRECTION

Patent No. 3,068,290                                    December 11, 1962

Robert Lichtenberger et al.

It is hereby certified that error appears in the above numbered patent requiring correction and that the said Letters Patent should read as corrected below.

Column 2, line 59, for "catalyst" read -- catalysts --; column 4, line 26, for "pratcically" read -- practically --; line 33, for "ethylene diamine" read -- ethylenediamine --; line 35, for "momonethanolamine" read -- monoethanolamine --; column 6, line 19, for "52.5%" read -- 51.5% --; line 31, for "of water-ethylenediamine" read -- of a water-ethylenediamine --; column 7, lines 44 and 45, after "corresponding" insert -- to --; column 8, line 34, for "mixtures" read -- mixture --.

Signed and sealed this 18th day of June 1963.

(SEAL)
Attest:

ERNEST W. SWIDER                                            DAVID L. LADD
Attesting Officer                                             Commissioner of Patents